United States Patent
Xu et al.

(10) Patent No.: US 11,139,933 B2
(45) Date of Patent: Oct. 5, 2021

(54) METHOD OF MAPPING CSI-RS PORTS TO ANTENNA UNITS, BASE STATION AND USER EQUIPMENT

(71) Applicant: Sun Patent Trust, New York, NY (US)

(72) Inventors: Ming Xu, Beijing (CN); Masayuki Hoshino, Kanagawa (JP); Akihiko Nishio, Osaka (JP); Kazuki Takeda, Kanagawa (JP); Lilei Wang, Beijing (CN)

(73) Assignee: Sun Patent Trust, New York, NY (US)

( * ) Notice: Subject to any disclaimer, the term of this patent is extended or adjusted under 35 U.S.C. 154(b) by 0 days.

(21) Appl. No.: 14/777,710

(22) PCT Filed: Apr. 2, 2013

(86) PCT No.: PCT/CN2013/073602
§ 371 (c)(1),
(2) Date: Sep. 16, 2015

(87) PCT Pub. No.: WO2014/161145
PCT Pub. Date: Oct. 9, 2014

(65) Prior Publication Data
US 2016/0112167 A1    Apr. 21, 2016

(51) Int. Cl.
*H04L 5/00*    (2006.01)
*H04B 7/0456*    (2017.01)
(Continued)

(52) U.S. Cl.
CPC .......... *H04L 5/0048* (2013.01); *H04B 7/0456* (2013.01); *H04L 1/0026* (2013.01);
(Continued)

(58) Field of Classification Search
CPC ... H04B 7/0456; H04L 1/0026; H04L 5/0023; H04L 5/0048; H04L 5/005; H04L 5/006;
(Continued)

(56) References Cited

U.S. PATENT DOCUMENTS

| | | |
|---|---|---|
| 8,086,242 B2 | 12/2011 | Kent et al. |
| 9,036,516 B2 | 5/2015 | Kent et al. |

(Continued)

FOREIGN PATENT DOCUMENTS

| | | |
|---|---|---|
| CN | 101272170 A | 9/2008 |
| CN | 101505180 A | 8/2009 |

(Continued)

OTHER PUBLICATIONS

3GPP TSG-RAN WG1 #66 R1-112420; Athens, Greece, Aug. 22-26, 2011; Source: Alcatel-Lucent Shanghai Bell, Alcatel-Lucent; Title: Considerations on CSI feedback enhancements for high-priority (Year: 2011).*

(Continued)

*Primary Examiner* — Kibrom T Hailu
*Assistant Examiner* — Nizam U Ahmed
(74) *Attorney, Agent, or Firm* — Seed IP Law Group LLP

(57) ABSTRACT

The present disclosure provides a communication method of mapping CSI-RS ports to antenna units arranged in an antenna array system, a base station, and a user equipment, the communication method comprises steps of: selecting a group of antenna units to map to the CSI-RS ports in a first CSI-RS transmission period or a first frequency resource region; and selecting another group of antenna units to map to the CSI-RS ports in a second CSI-RS transmission period or a second frequency resource region. By the method, base station, and user equipment according to the present disclosure, each antenna unit would get a relatively fair opportunity for transmitting the CSI-RS signals or get a fairly good channel estimation performance in UE side.

14 Claims, 8 Drawing Sheets

(51) Int. Cl.
*H04L 1/00* (2006.01)
*H04W 16/28* (2009.01)
*H04W 72/04* (2009.01)
*H04L 25/02* (2006.01)

(52) U.S. Cl.
CPC ............. *H04L 5/005* (2013.01); *H04W 16/28* (2013.01); *H04W 72/042* (2013.01); *H04L 5/006* (2013.01); *H04L 5/0023* (2013.01); *H04L 5/0094* (2013.01); *H04L 25/0224* (2013.01)

(58) Field of Classification Search
CPC .... H04L 5/0094; H04W 16/28; H04W 72/042
USPC ......................................................... 370/329
See application file for complete search history.

(56) References Cited

U.S. PATENT DOCUMENTS

| | | | |
|---|---|---|---|
| 9,119,209 B2* | 8/2015 | Nam .................... | H04W 72/046 |
| 9,680,537 B2 | 6/2017 | Inoue et al. | |
| 2008/0233965 A1 | 9/2008 | Kent et al. | |
| 2012/0058791 A1* | 3/2012 | Bhattad ................ | H04L 5/0016 |
| | | | 455/509 |
| 2012/0082128 A1 | 4/2012 | Kent et al. | |
| 2012/0108254 A1* | 5/2012 | Kwon .................. | H04L 5/0023 |
| | | | 455/450 |
| 2012/0113816 A1* | 5/2012 | Bhattad ................ | H04L 5/0032 |
| | | | 370/246 |
| 2012/0120905 A1 | 5/2012 | Ko et al. | |
| 2012/0134273 A1* | 5/2012 | Bhattad ................ | H04L 5/0048 |
| | | | 370/241 |
| 2012/0176939 A1 | 7/2012 | Qu et al. | |
| 2012/0288022 A1 | 11/2012 | Guey et al. | |
| 2013/0039203 A1 | 2/2013 | Fong et al. | |
| 2013/0083681 A1* | 4/2013 | Ebrahimi Tazeh Mahalleh .......... | |
| | | | H04L 5/0057 |
| | | | 370/252 |
| 2014/0098689 A1* | 4/2014 | Lee ..................... | H04B 7/0469 |
| | | | 370/252 |
| 2014/0187171 A1 | 7/2014 | Xiao et al. | |
| 2015/0139112 A1* | 5/2015 | Park .................... | H04B 7/0619 |
| | | | 370/329 |
| 2015/0201346 A1* | 7/2015 | Wu ....................... | H04L 5/001 |
| | | | 370/252 |
| 2015/0223208 A1* | 8/2015 | Park ..................... | H04L 5/001 |
| | | | 370/329 |
| 2015/0288497 A1* | 10/2015 | Li ........................ | H04B 7/0413 |
| | | | 370/329 |
| 2015/0318908 A1* | 11/2015 | Ko ....................... | H04L 1/00 |
| | | | 375/267 |
| 2015/0358060 A1* | 12/2015 | Park ..................... | H04L 1/06 |
| | | | 370/329 |

FOREIGN PATENT DOCUMENTS

| | | |
|---|---|---|
| CN | 101848017 A | 9/2010 |
| CN | 103002497 A | 3/2013 |
| KR | 10-2005-0099149 A | 10/2005 |
| WO | 2011/013989 A2 | 2/2011 |
| WO | 2011/106457 A2 | 9/2011 |
| WO | 2013/024852 A1 | 2/2013 |
| WO | 2013/147565 A2 | 10/2013 |

OTHER PUBLICATIONS

3GPP TR 37.840 V12.0.0, "3rd Generation Partnership Project; Technical Specification Group Radio Access Network; Study of Radio Frequency (RF) and Electromagnetic Compatibility (EMC) requirements for Active Antenna Array System (AAS) base station (Release 12)," Mar. 2013, 84 pages.

International Search Report dated Jan. 2, 2014, for corresponding International Application No. PCT/CN2013/073602, 2 pages.

ZTE, "Discussion on aggregated PMI feedback," R1-122136, 3GPP TSG WG1 Meeting #69, Agenda item: 7.5.1.5, Prague, Czech Republic, May 21-25, 2012, 7 pages.

Extended European Search Report, dated Feb. 23, 2016, for corresponding EP Application No. 13881039.5-1851 / 2982049, 13 pages.

Panasonic, "Scenarios for UE-specific elevation beamforming and FD-MIMO," R1-130324, 3GPP TSG RAN WG1 Meeting #72, Agenda Item: 7.3.6.1, St Julians's, Malta, Jan. 28-Feb. 1, 2013, 3 pages.

Alcatel-Lucent Shanghai Bell, Alcatel-Lucent, "Considerations on CSI feedback enhancements for high-priority antenna configurations," Agenda Item 6.6.2.1, R1-112420, *3GPP TSG-RAN WG1 #66*, Athens, Greece, Aug. 22-26, 2011, 7 pages.

* cited by examiner

8×8 antenna array (transmit unit and CSI-RS port mapping)

S1301 selecting a group of antenna units to map to the CSI-RS ports in a first CSI-RS transmission period or a first frequency resource region, and selecting another group of antenna units to map to the CSI-RS ports in a second CSI-RS transmission period or a second frequency resource region, wherein the antenna units in each group are separately distributed in frequency domain or time domain

Fig.13

S1401 selecting a group of antenna units to map to the CSI-RS ports on resource blocks, the resource blocks sparsely selected at certain domain channels that are more flat for mapping of the antenna units and the CSI-RS ports

Fig.14

METHOD OF MAPPING CSI-RS PORTS TO ANTENNA UNITS, BASE STATION AND USER EQUIPMENT

TECHNICAL FIELD

The present disclosure relates to a method of mapping CSI-RS (channel state information-reference signal) ports to antenna units in FD-MIMO (full dimension multiple-input multiple-output) communication system in LTE (Long Term Evolution).

BACKGROUND ART

Beamforming which is a kind of multiple antenna technology has been already adopted in early Long Term Evolution (LTE) standard release to enhance the coverage throughput. With respect to this technology, people were mainly focusing on azimuth domain so far. For example, how to form a horizontal beam using a certain weighting vector has been studied. In elevation domain, a fixed downtilt instead of a certain dynamic beam is supported in current LTE system.

With the increase of requirement on the elevation domain beamforming, 3D beamforming seems more and more important especially in urban area, in which users locate on different floors of the building. Using traditional horizontal beamforming technology can not serve these users very well, so the elevation domain and the horizontal domain both need to consider the beamfoming, which is actually the 3D beamforming.

FIG. 1 shows an example of typical 3D beamforming. As shown in FIG. 1, the 3D beam sent from eNB (base station) 101 is serving the users on a certain floor of a building 102. The beam could also serve the users on another floor dynamically. Therefore, the 3D beamforming could utilize vertical antenna units (or vertical beamforming) to further improve the system performance and potentially reduce the interference to other cells. To realize the 3D beamforming, the active antenna system (AAS) is the basis.

FIG. 2 shows a general AAS radio architecture in 3GPP TR 37.840. As shown in FIG. 2, a transceiver unit array (TUA) 201 assumes one-by-one mapping between the transceiver units #1, #2, . . . #K and the antenna ports. A radio distribution network (RDN) 202 could realize the mapping between the TUA 201 and the antenna array 203. By using the AAS system, a network could dynamically adjust all the elevation (or downtilt) and azimuth of the beam, and relevant beamwidth.

As the 3GPP TR 37.840 indicates, there could be different AAS deployment scenarios, such as Wide Area AAS (Macro AAS), Medium Range AAS (Micro AAS), and Local Area coverage AAS (Pico AAS), depending on the level of minimum coupling loss, the location of eNB (base station) antennas, etc. The range of each AAS scenario could be benefited from the 3D beamforming.

In 3GPP Release12, potentially two study items related with the 3D beamforming would be discussed: one is the elevation beamforming and another is the FD-MIMO. The former assumes maximum 8 antenna ports and the latter could support {16, 32, 64} or even larger antenna ports. The antenna port is a kind of logical signals which may be transmitted by several antenna units (physical antennas).

FIG. 3 shows a FD-MIMO with 8×8 antenna array structure. As shown in FIG. 3, the FD-MIMO which supports 64 antenna units potentially may need 64 CSI-RS ports to estimate the full dimension channels. In the 8×8 antenna array structure, the space of respective antennas may be 0.5λ.

FIG. 4 schematically shows CSI-RS regions per PRB (physical resource block) in release 11 of LTE. As shown in FIG. 4, the regions indicated with slash line "\" are the CSI-RS ports on the PRB for transmitting CSI-RS signals from the base station to user equipments. If it is true that 64 CSI-RS ports are needed for the FD-MIMO, the problem is that in current release 11 of the LTE, only 40 REs (resource element) are used as the CSI-RS ports per PRB. So how to allocate 64 antenna units to the CSI-RS ports is a problem.

SUMMARY OF THE DISCLOSURE

The present disclosure is made in consideration of the above aspects.

According to one aspect of the present disclosure, there is provided a communication method of mapping CSI-RS ports to antenna units arranged in an antenna array system, comprising steps of: selecting a group of antenna units to map to the CSI-RS ports in a first CSI-RS transmission period or a first frequency resource region; and selecting another group of antenna units to map to the CSI-RS ports in a second CSI-RS transmission period or a second frequency resource region. In the present aspect, multiple groups of antenna units may be selected to map to the CSI-RS ports in different CSI-RS transmission periods.

According to the above aspect, a part of CSI-RS ports mapping the antenna units reflect a first channel vector, and another part of CSI-RS ports mapping the antenna units reflect a second channel vector which is orthogonal or quasi-orthogonal with the first channel vector.

According to the above aspect, the part of CSI-RS ports reflecting the first channel vector and/or the other part of CSI-RS ports reflecting the second channel vector are more separately distributed in frequency domain or time domain.

According to another aspect of the present disclosure, there is provided a communication method of mapping CSI-RS ports to antenna units arranged in an antenna array system, comprising steps: selecting a group of antenna units to map to the CSI-RS ports in a first CSI-RS transmission period or a first frequency resource region; and selecting another group of antenna units to map to the CSI-RS ports in a second CSI-RS transmission period or a second frequency resource region, wherein the antenna units in each group are separately distributed in frequency domain or time domain.

According to a further aspect of the present disclosure, there is provided a communication method of mapping CSI-RS ports to antenna units arranged in an antenna array system, comprising steps of: selecting a group of antenna units to map to the CSI-RS ports on resource blocks, in which the resource blocks are sparsely selected at certain domain channels that are more flat for the mapping of the antenna units and the CSI-RS ports.

According to a further aspect of the present disclosure, there is provided a base station for mapping CSI-RS ports to antenna units arranged in an antenna array system, comprising: a mapping unit configured to select a group of antenna units to map to the CSI-RS ports in a first CSI-RS transmission period or a first frequency resource region, and select another group of antenna units to map to the CSI-RS ports in a second CSI-RS transmission period or a second frequency resource region. In the present aspect, the mapping unit may select multiple groups of antenna units to map to the CSI-RS ports in different CSI-RS transmission periods.

According to the above aspect, a part of CSI-RS ports mapping the antenna units reflect a first channel vector, and another part of CSI-RS ports mapping the antenna units reflect a second channel vector which is orthogonal or quasi-orthogonal with the first channel vector.

According to the above aspect, the part of CSI-RS ports reflecting the first channel vector and/or the other part of CSI-RS ports reflecting the second channel vector are more separately distributed in frequency domain or time domain.

According to a further aspect of the present disclosure, there is provided a base station of mapping CSI-RS ports to antenna units arranged in an antenna array system, comprising: a mapping unit configured to select a group of antenna units to map to the CSI-RS ports in a first CSI-RS transmission period or a first frequency resource region, and select another group of antenna units to map to the CSI-RS ports in a second CSI-RS transmission period or a second frequency resource region, wherein the antenna units in each group are separately distributed in frequency domain or time domain.

According to a further aspect of the present disclosure, there is provided a base station of mapping CSI-RS ports to antenna units arranged in an antenna array system, comprising: a mapping unit configured to select a group of antenna units to map to the CSI-RS ports on resource blocks, in which the resource blocks are sparsely selected at certain domain channels that are more flat for the mapping of the antenna units and the CSI-RS ports.

According to a further aspect of the present disclosure, there is provided a user equipment, comprising: a receiving unit configured to receive from a base station a message indicating that a group of antenna units in an antenna array are mapped to CSI-RS ports in a first CSI-RS transmission period or a first frequency resource region, and another group of antenna units in the antenna array are mapped to the CSI-RS ports in a second CSI-RS transmission period or a second frequency resource region. In the present aspect, the message further indicates that multiple groups of antenna units are mapped to the CSI-RS ports in different CSI-RS transmission periods.

According to the above aspect, a part of CSI-RS ports mapping the antenna units reflect a first channel vector, and another part of CSI-RS ports mapping the antenna units reflect a second channel vector which is orthogonal or quasi-orthogonal with the first channel vector.

According to the above aspect, the part of CSI-RS ports reflecting the first channel vector and/or the other part of CSI-RS ports reflecting the second channel vector are more separately distributed in frequency domain or time domain.

According to a further aspect of the present disclosure, there is provided a user equipment, comprising: a receiving unit configured to receive from a base station a message indicating that a group of antenna units are mapped to the CSI-RS ports in a first CSI-RS transmission period or a first frequency resource region, and another group of antenna units are mapped to the CSI-RS ports in a second CSI-RS transmission period or a second frequency resource region, wherein the antenna units in each group are separately distributed in frequency domain or time domain.

According to a further aspect of the present disclosure, there is provided a user equipment, comprising: a receiving unit configured to receive from a base station a message indicating that a group of antenna units are mapped to CSI-RS ports on resource blocks, in which the resource blocks are sparsely selected at certain domain channels that are more flat for the mapping of the antenna units and the CSI-RS ports.

The method, base station, and user equipment of the present disclosure could realize advantages that each antenna unit would get a relatively fair opportunity to perform the CSI-RS port transmission, and get a well channel estimation performance.

BRIEF DESCRIPTION OF THE DRAWINGS

These and/or other aspects and advantages of the present disclosure will become more clear and easier to be understood in detailed description of embodiments of the present disclosure below in conjunction with attached drawings, in which:

FIG. 13 shows a flow chart of a method of mapping the antenna units to the CSI-RS ports according to the second embodiment of the present disclosure; and FIG. 14 shows a flow chart of a method of mapping the antenna units to the CSI-RS ports according to the third embodiment of the present disclosure.

DESCRIPTION OF THE EMBODIMENTS

Figure 1:
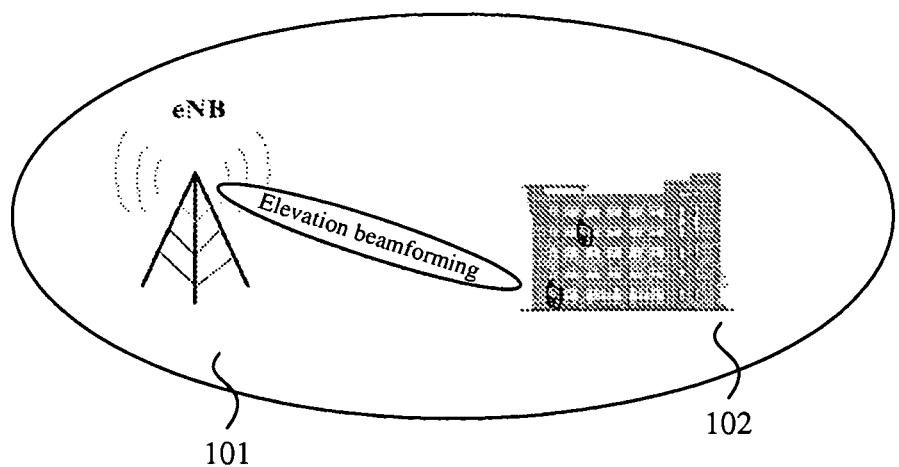
FIG. 1 shows an example of traditional 3D beamforming.
Figure 2:
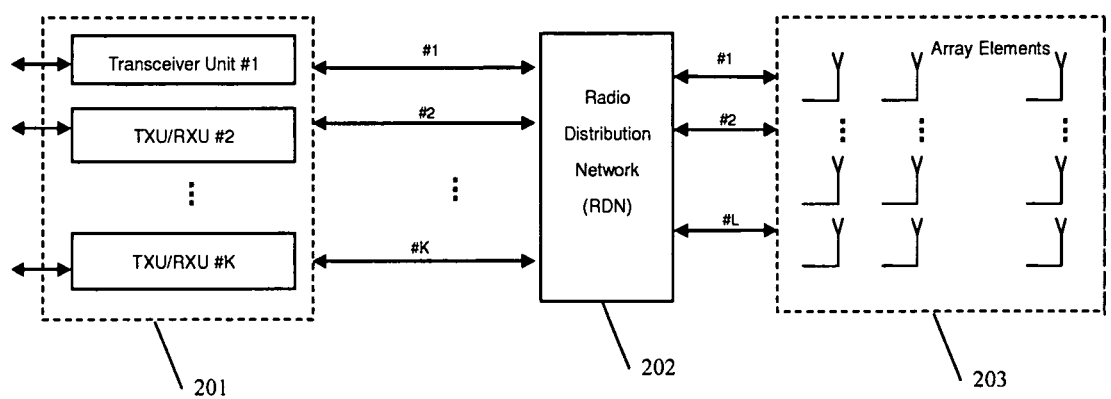
FIG. 2 shows a general AAS radio architecture in 3GPP TR 37.840.

In the following detailed description, reference is made to the accompanying drawings, which form a part of the present disclosure. In the drawings, similar symbols typically indicate similar components, unless the context dictates otherwise. It will be readily understood that aspects of the present disclosure can be arranged, substituted, combined, and designed in a wide variety of different configurations, all of which are explicitly contemplated and make a part of the present disclosure.

In this specification, it is mainly focused on the macro AAS scenario, but any other scenario mentioned above could also be feasible case. In this specification, the FD-MIMO with 64 antenna units is taken as an example, but the present disclosure could also be used for other case such as FD-MIMO with smaller or larger than 64 antenna units, or elevation beamforming which only supports 8 antenna ports.

Figure 5:
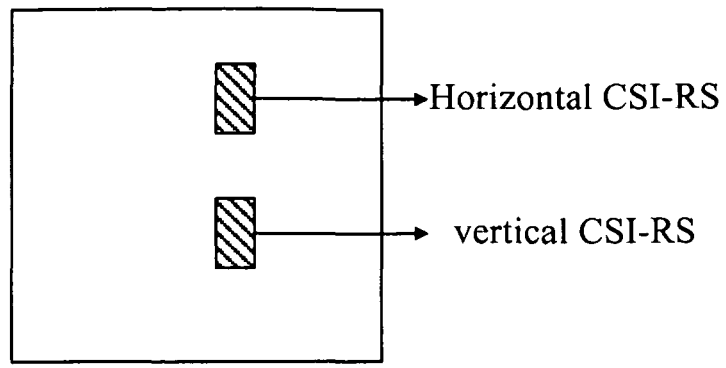
FIG. 5 shows two CSI-RS resources reflecting orthogonal channel vectors.

FIG. 5 shows two CSI-RS resources reflecting orthogonal channel vectors. To solve the problem stated in the background art, one straightforward way is that eNB sends two orthogonal CSI-RS resource groups (each group has 8 CSI-RS ports) to relax the requirement of urgent CSI-RS resources. For example, the two orthogonal CSI-RS resource groups are transmitted, one of which reflects horizontal domain channels and another one reflects vertical domain channels. Users could utilize the two orthogonal CSI-RS resource groups to reconstruct the whole 8×8 antenna array channels by utilizing the correlation property of the full dimension antenna array. This would reduce the need for the CSI-RS ports largely although the performance may have some loss.

Even though the above straightforward way may be workable, it has some problems which may impact the 3D beamforming performance. One problem (issue-I) is the unbalanced channel estimation performance caused by the fixed mapping of the transmission antenna units to the CSI-RS ports.

Figure 6:
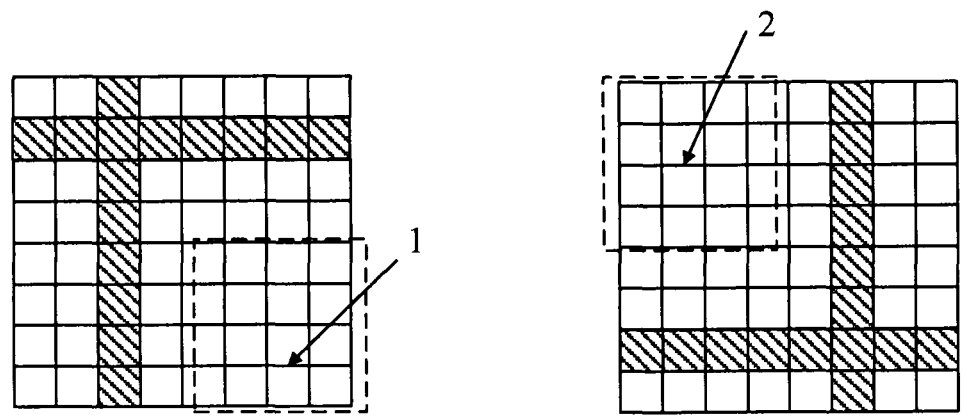
FIG. 6 shows a scenario of fixed mapping of transmission antenna units and the CSI-RS ports.

FIG. 6 shows a scenario of fixed mapping of the transmission antenna units and CSI-RS ports. As shown in FIG. 6, if the row 2 and column 3 of the antenna units are used for mapping to the CSI-RS ports for transmitting the CSI-RS signals, some regions such as the row 7 and column 7 of the antenna units which is indicated by the arrow 1 and far from the row 2 and column 3 may have bad channel estimation performance. Alternatively, if the row 7 and column 6 of the antenna units are used for mapping to the CSI-RS ports for transmitting the CSI-RS signals, some regions such as the row 2 and column 2 of the antenna units which is indicated by the arrow 2 may have some bad channel estimation performance. Even if we consider the relatively middle regions of the antenna units for mapping to the CSI-RS ports, the edge regions may still have bad channel estimation performance. But instead, the region near to the antenna units for mapping to the CSI-RS ports would have relatively good channel estimation performance.

With respect to the above issue-I, the present discourse proposes a solution of variable mapping of the antenna units to the CSI-RS ports to average the unbalance of channel estimation in the straightforward way. The variable mapping eliminates the channel estimation performance degradation that may be caused in the conventional method by averaging the channel estimation difference among different antenna units (in time, frequency or mixed domain). A typical example of the variable mapping pattern is to cyclically shift the mapping of the antenna units and the CSI-RS ports. Regarding the mapping pattern, besides the typical orthogonal cross pattern, other partial cross pattern or distributed pattern could also be used, which could be configured by physical signaling, MAC or RRC (radio resource control) signaling based on a certain rule. Cross point index of the cross pattern could also be used as an easy way for indicating the mapping pattern.

Another problem (issue-II) is the large overhead of the CSI-RS resources. Even in the above scenario, 16 CSI-RS ports are still needed. If CoMP or other reference signals are taken into account, the downlink efficiency may be impacted largely, so it needs to consider some schemes to relax the CSI-RS overhead further.

With respect to the above issue-II, the present disclosure proposes to allocate the pattern with different granularity for each orthogonal CSI-RS resource to further reduce the downlink overhead by taking into account the possible different property of the horizontal domain channels and vertical domain channels. For example, if one direction domain channel (for example, the vertical domain channel) is more flat, we can somehow send relatively sparse CSI-RS resources reflecting the vertical domain channel.

The present disclosure will be described below in conjunction with the drawings.

1. The First Embodiment

The first embodiment of the present disclosure is a variable mapping of the antenna units and the CSI-RS ports.

Figure 7:
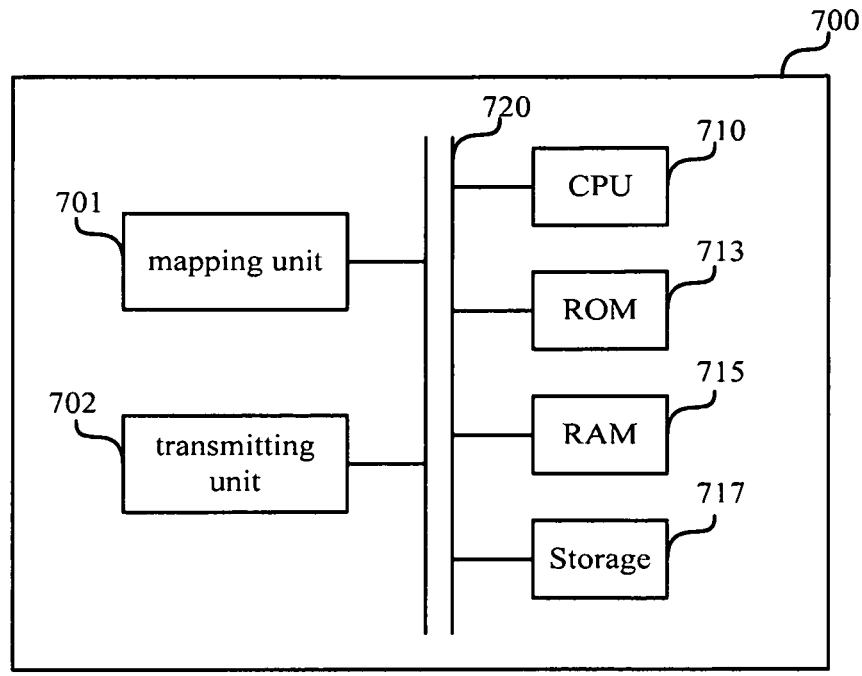
FIG. 7 is a block diagram schematically showing a base station (eNB) according to an embodiment of the present disclosure.

FIG. 7 is a block diagram schematically showing a base station (eNB) 700 according to an embodiment of the present disclosure. In the present embodiment, the eNB 700 has a function of mapping the CSI-RS ports to the antenna units arranged in an antenna array system. The eNB 700 comprises a mapping unit 701 which is configured to select a group of antenna units to map to the CSI-RS ports in a first CSI-RS transmission period or a first frequency resource region, and select another group of antenna units to map to the CSI-RS ports in a second CSI-RS transmission period or a second frequency resource region.

Figure 3:
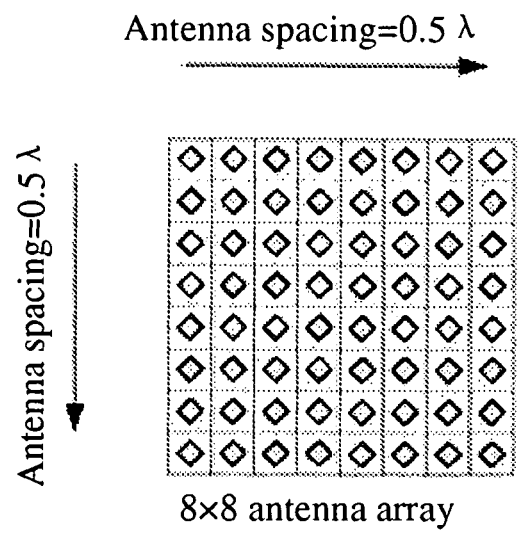
FIG. 3 shows a FD-MIMO with 8×8 antenna array structure.
Figure 4:
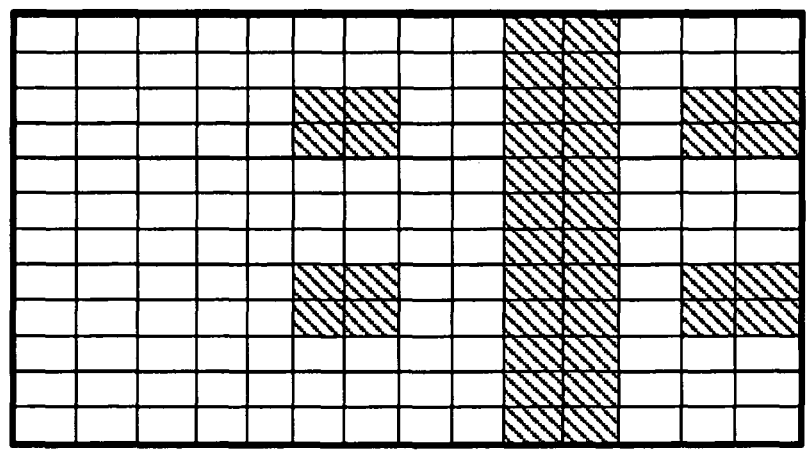
FIG. 4 schematically shows CSI-RS regions per PRB in release 11 of the LTE.
Figure 8A:
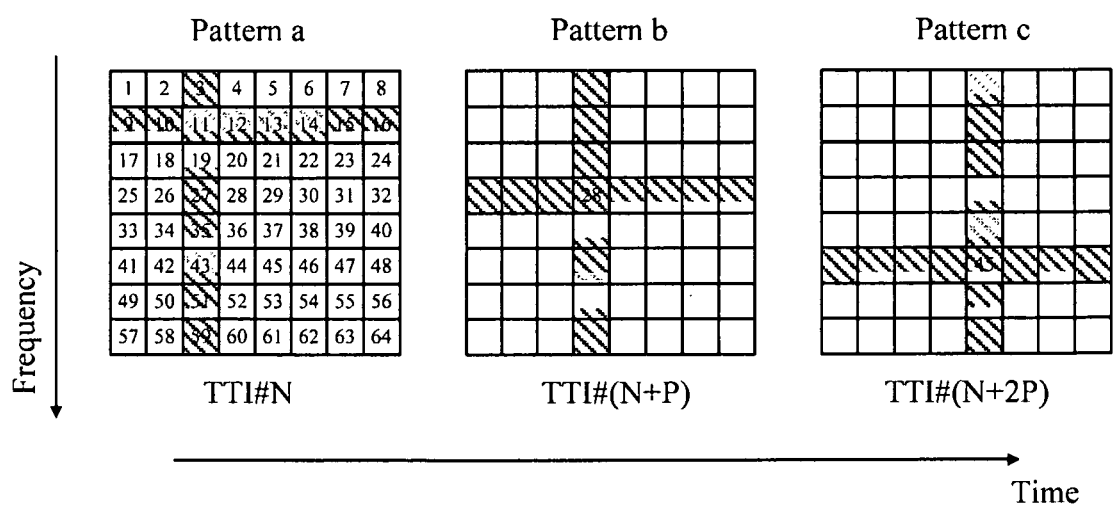
FIG. 8A shows antenna unit-CSI-RS port mapping variable in time domain according to a first embodiment of the present disclosure.
Figure 8B:
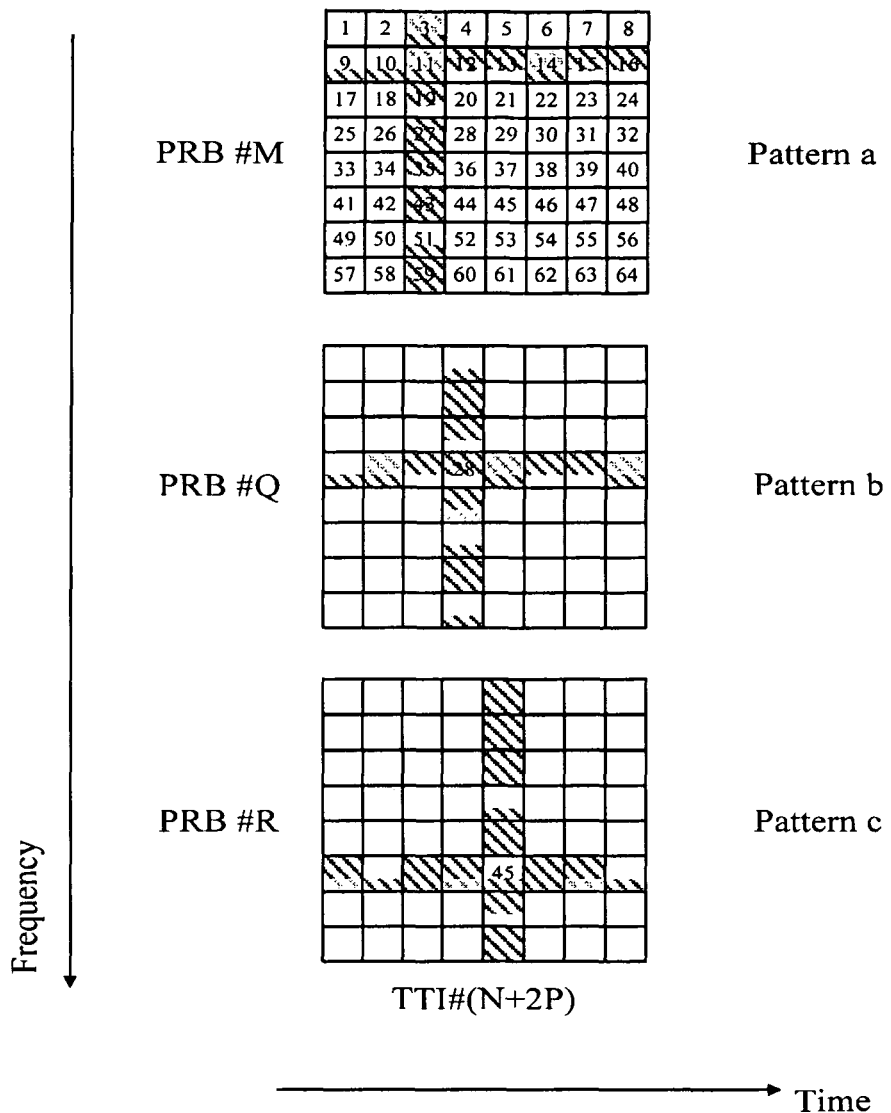
FIG. 8B shows antenna unit-CSI-RS port mapping variable in frequency domain according to the first embodiment of the present disclosure.

FIG. 8A and FIG. 8B show variable antenna unit-CSI-RS port mapping according to the first embodiment of the present disclosure. Specifically, FIG. 8A shows antenna unit-CSI-RS port mapping variable in time domain according to the first embodiment, and FIG. 8B shows antenna unit-CSI-RS port mapping variable in frequency domain according to the first embodiment. In the present embodiment, as shown in FIG. 3 and FIG. 4, the plurality of antenna units are arranged in 8×8 antenna array, and the number of CSI-RS ports is less than 40.

Specifically, as shown in FIG. 8A, the mapping unit 701 selects a group of antenna units to map to certain CSI-RS ports in a first CSI-RS transmission period. For example, in TTI (transmission time interval)#N, a pattern 'a' is used, in which the row 2 and column 3 of the antenna units are selected to map to the CSI-RS ports. The mapping unit 701 selects another group of antenna units to map to the certain CSI-RS ports in a second CSI-RS transmission period. For example, in TTI #(N+P), a pattern 'b' is used, in which the row 4 and column 4 of the antenna units are selected to map to the CSI-RS ports. Here, 'P' is the period of a CSI-RS transmission, for example 5 ms.

Alternatively, as shown in FIG. 8B, the mapping unit 701 may select a group of antenna units to map to certain CSI-RS ports in a first frequency resource region. For example, in the PRB(Physical Resource Block)#M, the pattern 'a' is used, in which the row 2 and column 3 of the antenna units are selected to map to the CSI-RS ports. The mapping unit 701 may select another group of antenna units to map to the CSI-RS ports in a second frequency resource region. For example, in the PRB#Q, the pattern 'b' is used, in which the row 4 and column 4 of the antenna units are selected to map to the CSI-RS ports.

In the present embodiment, the mapping unit 701 may select multiple groups of antenna units to map to the CSI-RS ports in different CSI-RS transmission periods or different frequency resource regions. For example, a further pattern 'c' is used in TTI #(N+2P) as shown in FIG. 8A or PRB#R as shown in FIG. 8B, in which the row 6 and column 5 of the antenna units are selected to map to the CSI-RS ports. Here, the PRBs #M, #Q, #R are respective resource blocks distributed in the frequency domain of the communication system.

In the present embodiment, a part of CSI-RS ports mapping the antenna units reflect a first channel vector, and another part of CSI-RS ports mapping the antenna units reflect a second channel vector which is orthogonal or quasi-orthogonal with the first channel vector. For example, as shown in FIG. 8, the CSI-RS ports mapping with the antenna units in the rows 2, 4, 6 reflect horizontal channel vectors, and the CSI-RS ports mapping with the antenna units in the columns 3, 4, 5 reflect vertical channel vectors.

In the present embodiment, the eNB 700 may further comprise a transmitting unit 702 which is configured to transmit CSI-RS signals by cyclically shifting the groups of antenna units selected for mapping to the CSI-RS ports. For example, in the next period, the patterns a→b→c will be applied again. This is a simple example of cyclically shifting the mapping pattern of the antenna units and the CSI-RS ports.

The pattern variation could not only be cyclically shifted, but also could be based on some rules such as randomization formula. That is, the transmitting unit 702 may transmit the CSI-RS signals by randomly shifting the groups of antenna units selected for mapping to the CSI-RS ports. The randomization seed could rely on sub-frame index. According to another embodiment, the pattern variation may be based on candidates set predefined in advance at both the eNB side and the UE side.

The indication of mapping of the CSI-RS ports and the antenna units and relevant variation modes may be semi-statically configured by RRC signaling in terms of UE-specific or cell-specific manner. In the present embodiment, the transmitting unit 702 may transmit a message (information) indicating the mapping of the CSI-RS ports and the antenna units configured by RRC signaling or DCI signaling to the UEs. Below is an example of such indication by RRC signaling:

---

CSI-RS_antenna-unit_mapping-r12 {
Mode:0: full CSI-RS is transmitted 1: two orthogonal CSI-RS resources are transmitted
If (1),
{
CSI-RS ports number (for example 16);
Mapping pattern variation mode: 0: randomly changed 1: cyclic shift; 2:dynamic indication in L1 among four candidates 3:never changed;
If (0), random seed is based on subframe index;
If (1), cyclic shifted pattern;
If (2), four candidates set;
If (3), special pattern;
}
}

---

The above message could be enhancement to the CSI-RS-ConfigNZP-r11 in 3GPP 36.331 specification documents. In the present embodiment, in L1 based method, the transmission of the indication reuses some fields (e.g. CIF, RA) in DCI (downlink control information) in either common search space or UE-specific search space.

In case two orthogonal CSI-RS resources are assumed, how to indicate the specific position of the antenna units which are mapped to the CSI-RS ports in the 2D antenna array could have two options. One option is directly using coordinates manner. That is, the indication of mapping of the CSI-RS ports and the antenna units may be represented by coordinates. For example, in the present embodiment, the coordinates {4, 4} indicate that the row 4 and column 4 of the antenna units in the 2D antenna array are used for mapping to the CSI-RS ports as shown in FIG. 8A and FIG. 8B. Similarly, the coordinates (2, 3) indicate that the row 2 and column 3 of the antenna units in the 2D antenna array are used for mapping to the CSI-RS ports, and the coordinates (6, 5) indicate that the row 6 and column 5 of the antenna units in the 2D antenna array are used for mapping to the CSI-RS ports.

Another option is to use the cross point index. That is, according to another embodiment of the present disclosure, the indication of mapping of the CSI-RS ports and the antenna units may be represented by the cross point index. For example, the cross point index '11' is used to indicate that the row 2 and column 3 of the antenna units in the 2D antenna array are used for mapping to the CSI-RS ports, as shown in FIG. 8A and FIG. 8B. Similarly, the cross point index '28' indicates that the row 4 and column 4 of the antenna units in the 2D antenna array are used for mapping to the CSI-RS ports, and the cross point index '45' indicates that the row 6 and column 5 of the antenna units in the 2D antenna array are used for mapping to the CSI-RS ports.

To further reduce the indication overhead of the specific positions of the antenna units in for example L1 based method, fewer bits are also possible for such indication considering that the absolute value of 11 or 28 needs 4 or 5 bits. For example, four patterns (a pattern variation set) are indicated by the RRC signaling, in which 2 bits instead of 4 bits or 5 bits in L1 signaling are used to indicate the pattern of mapping of the CSI-RS ports and the antenna units.

The eNB 700 according to the present disclosure may further include a CPU (Central Processing Unit) 710 for executing related programs to process various data and control the operations of respective units in the eNB 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above mapping unit 701, transmitting unit 702, CPU 710, ROM 713, RAM 715 and/or storage unit 717 etc. may be interconnected via data and/or command bus 720 and transfer signals from one to another.

Respective units as described above do not limit the scope of the present disclosure. According to an embodiment of the disclosure, the functions of the mapping unit 701 and the transmitting unit 702 may also be implemented by one unit, and the functions of any or combination of the mapping unit 701 and the transmitting unit 702 may also be implemented by functional software in combination with the CPU 710, ROM 713, RAM 715 and/or storage unit 717 etc.

In the first embodiment of the present disclosure, each antenna unit would get a relatively fair opportunity for transmitting the CSI-RS signals or get a fairly good channel estimation performance.

2. The Second Embodiment

The second embodiment is that the applied CSI-RS port-antenna unit mapping pattern could be more distributed instead of one column and one row always.

Figure 9:
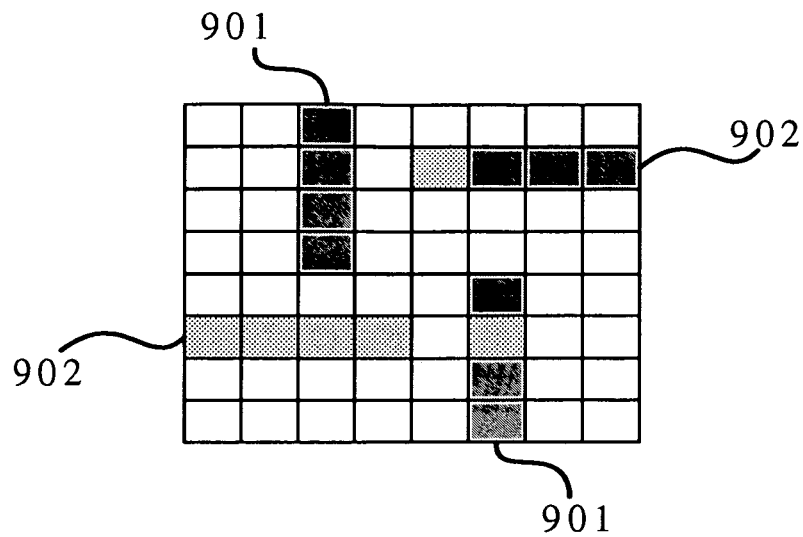
FIG. 9 shows a variable antenna unit-CSI-RS port mapping according to a second embodiment of the present disclosure.

FIG. 9 shows a variable antenna unit-CSI-RS port mapping according to the second embodiment of the present disclosure.

According to the second embodiment of the present disclosure, the mapping unit 701 (as shown in FIG. 7) may select a group of antenna units to map to the CSI-RS ports in a first CSI-RS transmission period or a first frequency resource region, and select another group of antenna units to map to the CSI-RS ports in a second CSI-RS transmission period or a second frequency resource region, in which the antenna units in each group may be more separately distributed in frequency domain or time domain.

Specifically, in the second embodiment of the present disclosure, a part of CSI-RS ports mapping the antenna units may reflect a first channel vector, and another part of CSI-RS ports mapping the antenna units may reflect a second channel vector which is orthogonal or quasi-orthogonal with the first channel vector. In the present embodiment, the first channel vector may be for example vertical channel vector, and the second channel vector may be for example horizontal channel vector. Further, according to the second embodiment of the present disclosure, the part of CSI-RS ports reflecting the first channel vector (for example, vertical channel vector) are more separately distributed in frequency domain or time domain, and/or the other part of CSI-RS ports reflecting the second channel vector (for example, horizontal channel vector) are more separately distributed in frequency domain or time domain.

For example, as shown in FIG. 9, the CSI-RS ports reflecting the vertical channel vector 901 are separated into two portions, and the CSI-RS ports reflecting the horizontal channel vector 902 are separated into two portions. Here, the two portions do not limit the scope of the present disclosure, which may also be three or more portions, or other manners causing the CSI-RS ports more separately distributed may be adopted. This manner causes the antenna units more distributed and potentially may be helpful to cancel the channel estimation difference among the antenna units.

Similarly with the first embodiment, the mapping unit 701 may also select multiple groups of antenna units to map to the CSI-RS ports in different CSI-RS transmission periods or different frequency resource regions. The transmitting unit 702 may transmit the CSI-RS signals by cyclically shifting the groups of antenna units selected for mapping to the CSI-RS ports, or transmit the CSI-RS signals by randomly shifting the groups of antenna units selected for mapping to the CSI-RS ports. The transmitting unit 702 may transmit a message or information indicating the mapping of the CSI-RS ports and the antenna units, configured by RRC signaling or DCI signaling, to the UEs. The message or information on the indication of mapping of the CSI-RS ports and the antenna units may reuse some fields in the DCI signaling in either common search space or UE-specific search space.

The indication of the specific positions of the antenna units for mapping to the CSI-RS ports may also be represented by coordinates. However, in the second embodiment of the present disclosure, the indication is more complicated because more bits are needed to indicate which antenna units are selected for mapping to the CSI-RS ports. For example, the coordinates {6,0,2,1;3,0,6,1} could be used for such indication, in which "6,0,2,1" indicates the first half (0) in the row 6 and the second half (1) in the row 2, and "3,0,6,1" indicates the first half (0) in the column 3 and the second half (1) in the column 6, as shown in FIG. 9.

In the above second embodiment of the present disclosure, each antenna unit would get a relatively fair opportunity for transmitting the CSI-RS signals or get a fairly good channel estimation performance.

3. The Third Embodiment

The third embodiment of the present disclosure is that differentiated allocation patterns for two orthogonal CSI-RS resources are used.

Figure 10:
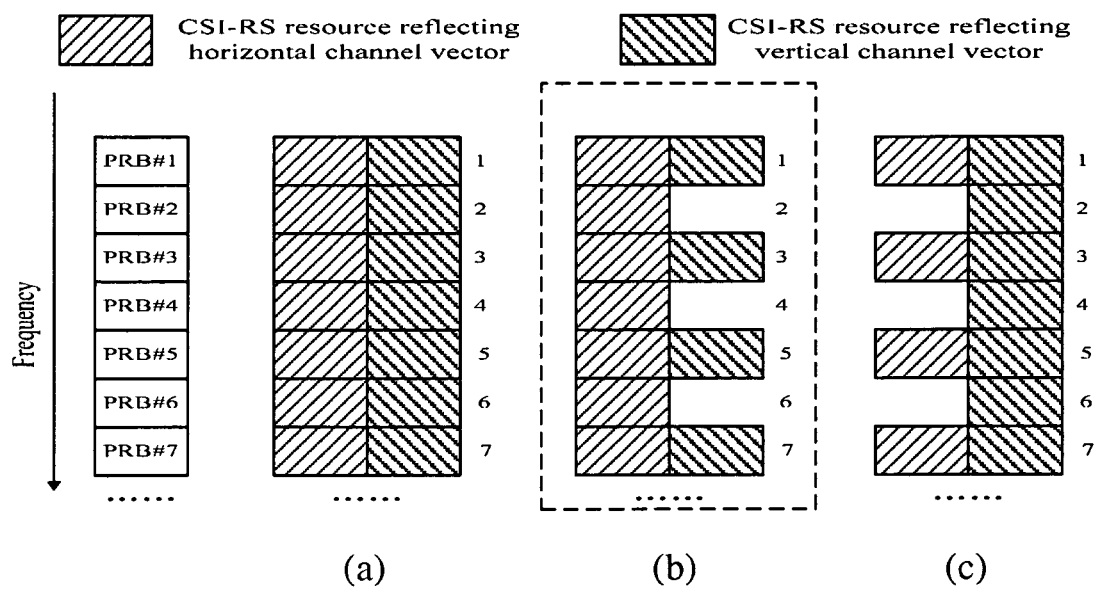
FIG. 10 shows different allocation patterns for the CSI-RS resources reflecting different orthogonal channel vectors according to a third embodiment of the present disclosure.

FIG. 10 shows different allocation patterns for the CSI-RS resources reflecting different orthogonal channel vectors according to the third embodiment of the present disclosure.

In FIG. 10, there are shown a plurality of physical resource blocks (PRB) arranged in the frequency domain, and two orthogonal CSI-RS resources reflecting horizontal channel vectors and vertical channel vectors are also shown. As shown in the FIG. 10(*a*), a group of CSI-RS resources 1-7 reflecting the horizontal channel vectors indicated by slash line "/" and another group of CSI-RS resources 1-7 reflecting the vertical channel vectors indicated by slash line "\" are evenly used.

However, in some scenarios, the vertical domain channel may be more flat than the horizontal domain channel. In this connection, according to the third embodiment of the present disclosure, the mapping unit 701 of the eNB 700 (as shown in FIG. 7) may select a group of antenna units to map to a number of CSI-RS ports on resource blocks, in which the resource blocks are sparsely selected at certain domain channels that are more flat for the mapping of the antenna units and the CSI-RS ports. Specifically, as shown in FIG. 10(*b*), dense CSI-SR resource blocks 1-7 are used for the horizontal domain channels and relatively sparse CSI-RS resource blocks 1, 3, 5, 7 are used for the vertical domain channels. That is, the mapping unit 701 may select the resource blocks at intervals in frequency domain for vertical domain channels if the vertical domain channels are more flat.

However, in the other hand, if the horizontal domain channels are more flat, relatively sparse distributions of the resource blocks reflecting the horizontal domain channels may be used, as shown in FIG. 10(*c*).

In the third embodiment of the present disclosure, the selection of each resource block for mapping of the antenna units and the CSI-RS ports is notified from eNB 700 to the UEs via RRC signaling in for example the following message:

```
{
1st/horizontal CSI-RS resource distribution bitmap;
2nd/vertical CSI-RS resource distribution bitmap;
}
```

The third embodiment of the present disclosure may be used in combination with or based on the first embodiment or the second embodiment as described above.

In the above third embodiment of the present disclosure, each antenna unit would get a relatively fair opportunity for transmitting the CSI-RS signals or get a fairly good channel estimation performance.

Figure 11:
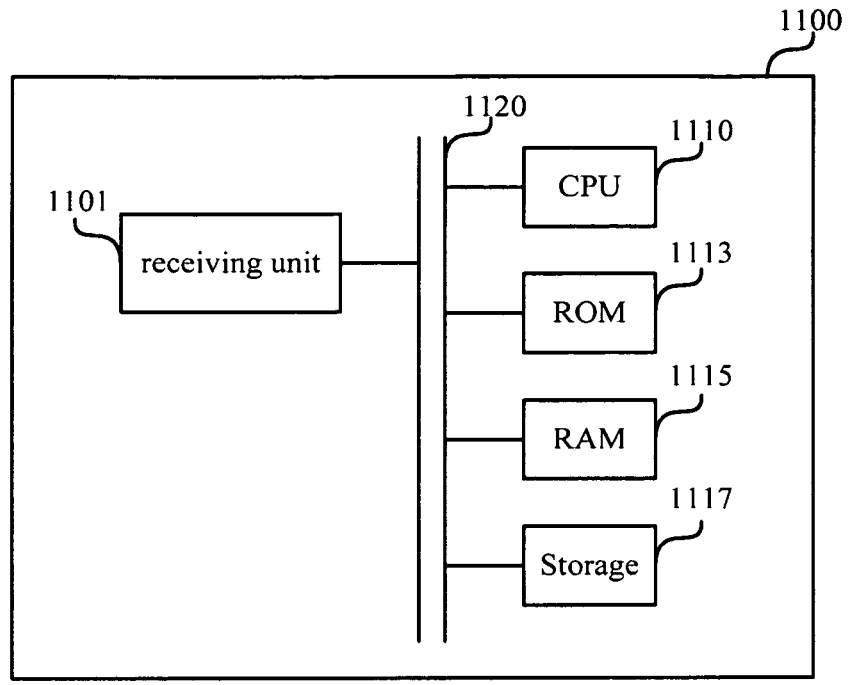
FIG. 11 is a block diagram schematically showing user equipment (UE) according to an embodiment of the present disclosure.

FIG. 11 is a block diagram showing a terminal (UE) according to an embodiment of the present disclosure. As shown in FIG. 11, the UE 1100 comprises a receiving unit 1101 which is configured to receive a message from the eNB 700, and the message indicates that a group of antenna units in an antenna array are mapped to CSI-RS ports in a first CSI-RS transmission period or a first frequency resource region, and another group of antenna units in the antenna array are mapped to the CSI-RS ports in a second CSI-RS transmission period or a second frequency resource region.

In the present embodiment, a part of the CSI-RS ports mapping the antenna units reflect a first channel vector, and another part of the CSI-RS ports mapping the antenna units reflect a second channel vector which is orthogonal or quasi-orthogonal with the first channel vector. Specifically, in the present embodiment, the CSI-RS ports mapping the antenna units in rows reflect horizontal channel vectors, and the CSI-RS ports mapping the antenna units in columns reflect vertical channel vectors.

In the present embodiment, the part of CSI-RS ports reflecting the first channel vector are more separately distributed in frequency domain or time domain, and/or the other part of CSI-RS ports reflecting the second channel vector are more separately distributed in frequency domain or time domain.

In the present embodiment, the message further indicates that multiple groups of antenna units are mapped to the CSI-RS ports in different CSI-RS transmission periods or different frequency resource regions, and the mapping of the multiple groups of antenna units and the CSI-RS ports are cyclically or randomly shifted, as described in the first embodiment.

In the present embodiment, the message indicating the mapping of the CSI-RS ports and the antenna units received from the eNB 700 is configured by RRC signaling and/or DCI signaling, and the message may reuse some fields in the DCI signaling in either common search space or UE-specific search space.

In the present embodiment, the indication of mapping of the CSI-RS ports and the antenna units is represented by coordinates or cross point index.

In another embodiment of the present disclosure, the receiving unit 1101 is configured to receive a message from the eNB 700, and the message indicates that a group of antenna units are mapped to the CSI-RS ports in a first CSI-RS transmission period or a first frequency resource region, and another group of antenna units are mapped to the CSI-RS ports in a second CSI-RS transmission period or a second frequency resource region, in which the antenna units in each group are separately distributed in frequency domain or time domain.

In a further embodiment of the present disclosure, the receiving unit 1101 is configured to receive a message from the eNB 700, and the message indicates that a group of antenna units are mapped to a number of CSI-RS ports on resource blocks, in which the resource blocks are sparsely selected at certain domain channels that are more flat for the mapping of the antenna units and the CSI-RS ports.

In the further embodiment of the present disclosure, the resource blocks are selected at intervals in frequency domain.

In addition, the UE 1100 according to the present disclosure may further include a CPU (Central Processing Unit) 1110 for executing related programs to process various data and control operations of respective units in the UE 1100, a ROM (Read Only Memory) 1113 for storing various programs required for performing various process and control by the CPU 1110, a RAM (Random Access Memory) 1115 for storing intermediate data temporarily produced in the procedure of process and control by the CPU 1110, and/or a storage unit 1117 for storing various programs, data and so on. The above receiving unit 1101, CPU 1110, ROM 1113, RAM 1115 and/or storage unit 1117 etc. may be interconnected via data and/or command bus 1120 and transfer signals from one to another.

Respective units as described above do not limit the scope of the present disclosure. According to an embodiment of the present disclosure, the functions of any or combination of the above receiving unit 1101 may also be implemented by functional software in combination with the above CPU 1110, ROM 1113, RAM 1115 and/or storage unit 1117 etc.

In the above embodiment of the present disclosure, each antenna unit would get a relatively fair opportunity for transmitting the CSI-RS signals or get a fairly good channel estimation performance.

Figure 12:
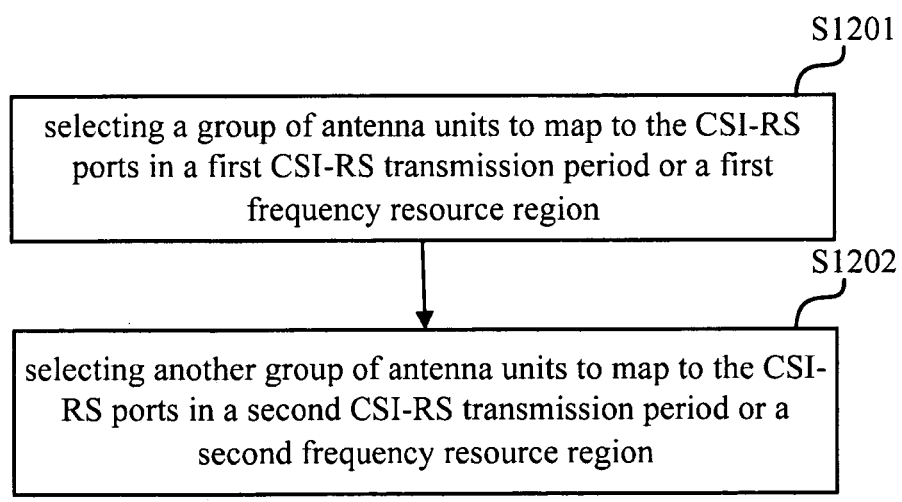
FIG. 12 shows a flow chart of a method of mapping the antenna units to the CSI-RS ports according to the first embodiment of the present disclosure.

FIG. 12 shows a flow chart of a method of mapping the antenna units to the CSI-RS ports according to the third embodiment of the present embodiment.

As shown in FIG. 12, the method begins at step S1201. At the step S1201, a group of antenna units in an antenna array are selected to map to CSI-RS ports in a first CSI-RS transmission period or a first frequency resource region. At the step S1202, another group of antenna units in the antenna array are selected to map to the CSI-RS ports in a second CSI-RS transmission period or a second frequency resource region. In the present embodiment, the steps S1201 and S1202 may be performed by the mapping unit 701 of the eNB 700 of the present disclosure.

In the present embodiment, a part of CSI-RS ports mapping the antenna units reflect a first channel vector, and another part of CSI-RS ports mapping the antenna units reflect a second channel vector which is orthogonal or quasi-orthogonal with the first channel vector.

In the present embodiment, the part of CSI-RS ports reflecting the first channel vector are more separately distributed in frequency domain or time domain, and/or the other part of CSI-RS ports reflecting the second channel vector are more separately distributed in frequency domain or time domain.

In the present embodiment, multiple groups of antenna units are selected to map to the CSI-RS ports in different CSI-RS transmission periods or different frequency resource regions.

In the present embodiment, the method further comprises a step of transmitting the CSI-RS signals by cyclically or randomly shifting the selected groups of antenna units. The above step may be performed by the transmitting unit 702 of the eNB 700 of the present disclosure.

In the present embodiment, the method further comprises a step of configuring a message indicating the mapping of the CSI-RS ports and the antenna units by RRC signaling or DCI signaling. The above step may be performed by the mapping unit 701 of the eNB 700 of the present disclosure. In the present embodiment, the above message reuses some fields in the DCI signaling in either common search space or UE-specific search space. The indication of mapping of the CSI-RS ports and the antenna units is represented by coordinates or cross point index. The plurality of antenna units may be arranged in 8×8 antenna array, and the number of CSI-RS ports may be less than 40.

FIG. 13 shows a flow chart of a method of mapping the antenna units to the CSI-RS ports according to the second embodiment of the present embodiment.

As shown in FIG. 13, at the step S1301, a group of antenna units are mapped to CSI-RS ports in a first CSI-RS transmission period or a first frequency resource region, and another group of antenna units are mapped to the CSI-RS ports in a second CSI-RS transmission period or a second frequency resource region, wherein the antenna units in each group are separately distributed in frequency domain or time domain. In the present embodiment, the step S1301 may be performed by the mapping unit 701 of the eNB 700 of the present disclosure.

In the present embodiment, a part of CSI-RS ports mapping the antenna units reflect a first channel vector, and another part of CSI-RS ports mapping the antenna units reflect a second channel vector which is orthogonal or quasi-orthogonal with the first channel vector.

In the present embodiment, the part of CSI-RS ports reflecting the first channel vector are more separately distributed in frequency domain or time domain, and/or the other part of CSI-RS ports reflecting the second channel vector are more separately distributed in frequency domain or time domain.

In the present embodiment, multiple groups of antenna units are selected to map to the CSI-RS ports in different CSI-RS transmission periods or different frequency resource regions.

In the present embodiment, the method further comprises a step of transmitting the CSI-RS signals by cyclically or randomly shifting the selected groups of antenna units. The above step may be performed by the transmitting unit 702 of the eNB 700 of the present disclosure.

In the present embodiment, the method further comprises a step of configuring a message indicating the mapping of the CSI-RS ports and the antenna units by RRC signaling or DCI signaling. The above step may be performed by the mapping unit 701 of the eNB 700 of the present disclosure. In the present embodiment, the above message reuses some fields in the DCI signaling in either common search space or UE-specific search space.

FIG. 14 shows a flow chart of a method of mapping the antenna units to the CSI-RS ports according to the third embodiment of the present embodiment.

As shown in FIG. 14, at the step S1401, a group of antenna units are selected to map to a number of CSI-RS ports on resource blocks, in which the resource blocks are sparsely selected at certain domain channels that are more flat for mapping of the antenna units and the CSI-RS ports. In the present embodiment, the step S1401 may be performed by the mapping unit 701 of the eNB 700 of the present disclosure.

In the present embodiment, the resource blocks are selected at intervals in frequency domain.

The above embodiments of the present disclosure are only exemplary description, and their specific structures and operations do not limit the scope of the present disclosure. Those skilled in the art can recombine different parts and operations of the above respective embodiments to produce new implementations which equally accord with the concept of the present disclosure.

The embodiments of the present disclosure may be implemented by hardware, software and firmware or in a combination thereof, and the way of implementation does not limit the scope of the present disclosure.

The connection relationships between the respective functional elements (units) in the embodiments of the present disclosure do not limit the scope of the present disclosure, in which one or multiple functional element(s) or unit(s) may contain or be connected to any other functional elements.

Although several embodiments of the present disclosure has been shown and described in combination with attached drawings above, those skilled in the art would understand that variations and modifications which still fall into the scope of claims and their equivalents of the present disclosure can be made to these embodiments without departing from the principle and spirit of the present disclosure.

What is claimed is:

1. A base station comprising:
a processor, which, in operation, sets channel state information-reference signal (CSI-RS) ports by aggregating a pair of CSI-RS resource groups selected from a set of pairs of CSI-RS resource groups,
the pair of CSI-RS resource groups including a first group and a second group,
the first group and the second group each have eight CSI-RS ports,
the pair of CSI-RS resource groups having a total number of sixteen CSI-RS ports,
the first group reflecting antennas with a first direction, and
the second group reflecting antennas with a second direction that is orthogonal to the first direction; and
a transmitter, which, in operation, transmits, to a single user equipment (UE), CSI-RSs using the set CSI-RS ports,
wherein the processor, in operation, selects first antenna units to which CSI-RS ports of a first pair of CSI-RS resource groups of the set of pairs of CSI-RS resource groups are mapped in at least one of a first CSI-RS transmission period and a first frequency resource region, and selects second antenna units to which CSI-RS ports of a second pair of CSI-RS resource groups of the set of pairs of CSI-RS resource groups are mapped in at least one of a second CSI-RS transmission period and a second frequency resource region, and
wherein the processor selects the second antenna units at least by cyclically shifting the first antenna units, wherein the processor applies the same first cyclic shift to antenna positions of the first antenna units that are in the first direction, and the processor applies the same second cyclic shift to antenna positions of the first antenna units that are in the second direction.

2. The base station of claim 1, wherein the total number of the set CSI-RS ports is sixteen (16).

3. The base station according to claim 1, wherein the CSI-RS ports have a one to one correspondence to antenna units in an antenna array.

4. The base station of claim 1, wherein the first group reflects antennas with a vertical direction and the second group reflects antennas with a horizontal direction.

5. The base station of claim 1, wherein the transmitter, in operation, transmits information about the set CSI-RS ports by at least one of radio resource control (RRC) signaling and downlink control information (DCI) signaling.

6. The base station of claim 1, wherein the CSI-RS ports of the first group reflect a first channel vector, and the CSI-RS ports the second group reflect a second channel vector which is orthogonal or quasi-orthogonal to the first channel vector.

7. The base station of claim 6, wherein at least one of the CSI-RS ports of the first group reflecting the first channel vector and the CSI-RS ports of the second group reflecting the second channel vector are dividedly distributed in at least one of a frequency domain and a time domain.

8. The base station of claim 1, wherein the processor, in operation, selects the first antenna units and the second antenna units differently in at least one of CSI-RS transmission periods and frequency resource regions.

9. The base station of claim 1, the transmitter, in operation, transmits the CSI-RSs by cyclically shifting the first or second antenna units.

10. The base station of claim 1, the transmitter, in operation, transmits the CSI-RSs by randomly shifting the first or second antenna units.

11. The base station of claim 1, the transmitter, in operation, transmits information about the mapping of the CSI-RS ports to the first and second antenna units to the UE by at least one of radio resource control (RRC) signaling and downlink control information (DCI) signaling.

12. The base station of claim 11, wherein the information indicates the mapping of the CSI-RS ports to the first and second antenna units by at least one of coordinates and cross point indices.

13. The base station of claim 1, wherein the first and second antenna units are dividedly distributed in at least one of a frequency domain and a time domain.

14. A communication method comprising:
 setting channel state information-reference signal (CSI-RS) ports by aggregating a pair of CSI-RS resource groups selected from a set of pairs of CSI-RS resource groups,
  the pair of CSI-RS resource groups including a first group and a second group,
  the first group and the second group each have eight CSI-RS ports,
  the pair of CSI-RS resource groups having a total number of sixteen CSI-RS ports,
  the first group reflecting antennas with a first direction, and
  the second group reflecting antennas with a second direction that is orthogonal to the first direction;
 selecting first antenna units, to which CSI-RS ports of a first pair of CSI-RS resource groups of the set of pairs of CSI-RS resource groups are mapped in at least one of a first CSI-RS transmission period and a first frequency resource region and selecting second antenna units to which CSI-RS ports of a second pair of CSI-RS resource groups of the set of pairs of CSI-RS resource groups are mapped in at least one of a second CSI-RS transmission period and a second frequency resource region, wherein the second antenna units are selected at least by:
  cyclically shifting the first antenna units, and
  applying the same first cyclic shift to antenna positions of the first antenna units that are in the first direction and applying the same second cyclic shift to antenna positions of the first antenna units that are in the second direction; and
 transmitting, to a single user equipment (UE), CSI-RSs using the set CSI-RS ports.

* * * * *